INVENTOR
GEORGE T. KLEIN
BY
ATTORNEY

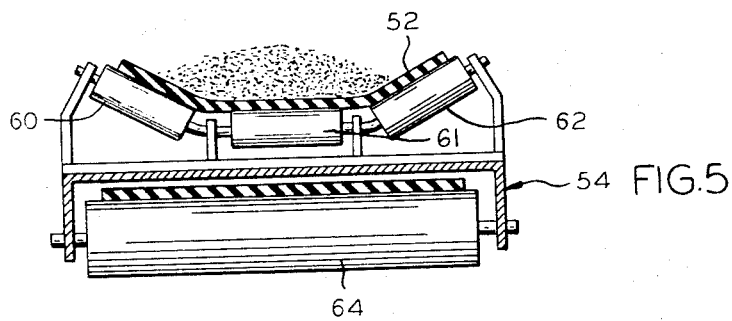
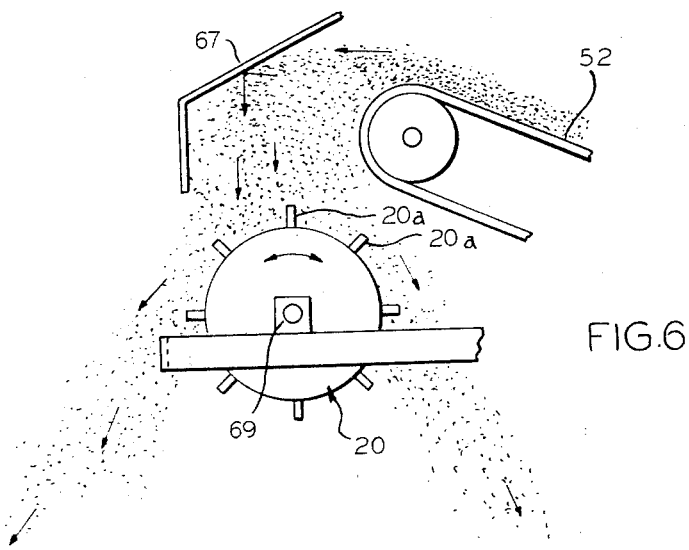

United States Patent Office 3,438,584
Patented Apr. 15, 1969

3,438,584
COMPOSTING DEVICE
George T. Klein, Glen Dale, Wis. (% Organic Compost Corporation, Germantown, Wis. 53022)
Filed May 19, 1967, Ser. No. 639,718
Int. Cl. A01c *17/00;* B01c *19/20;* B65g *65/22*
U.S. Cl. 239—651  7 Claims

ABSTRACT OF THE DISCLOSURE

Includes vehicle which has auger that works, turns and lifts rows of matter while vehicle is driven through the matter. The auger directs the matter toward the center thereof and thereafter lifts the matter whereupon a conveying means receives the matter from the auger and thereafter feeds same to a spreader which selectively guides the matter so it can be piled as it originally was prior to being worked.

---

Figure 1:
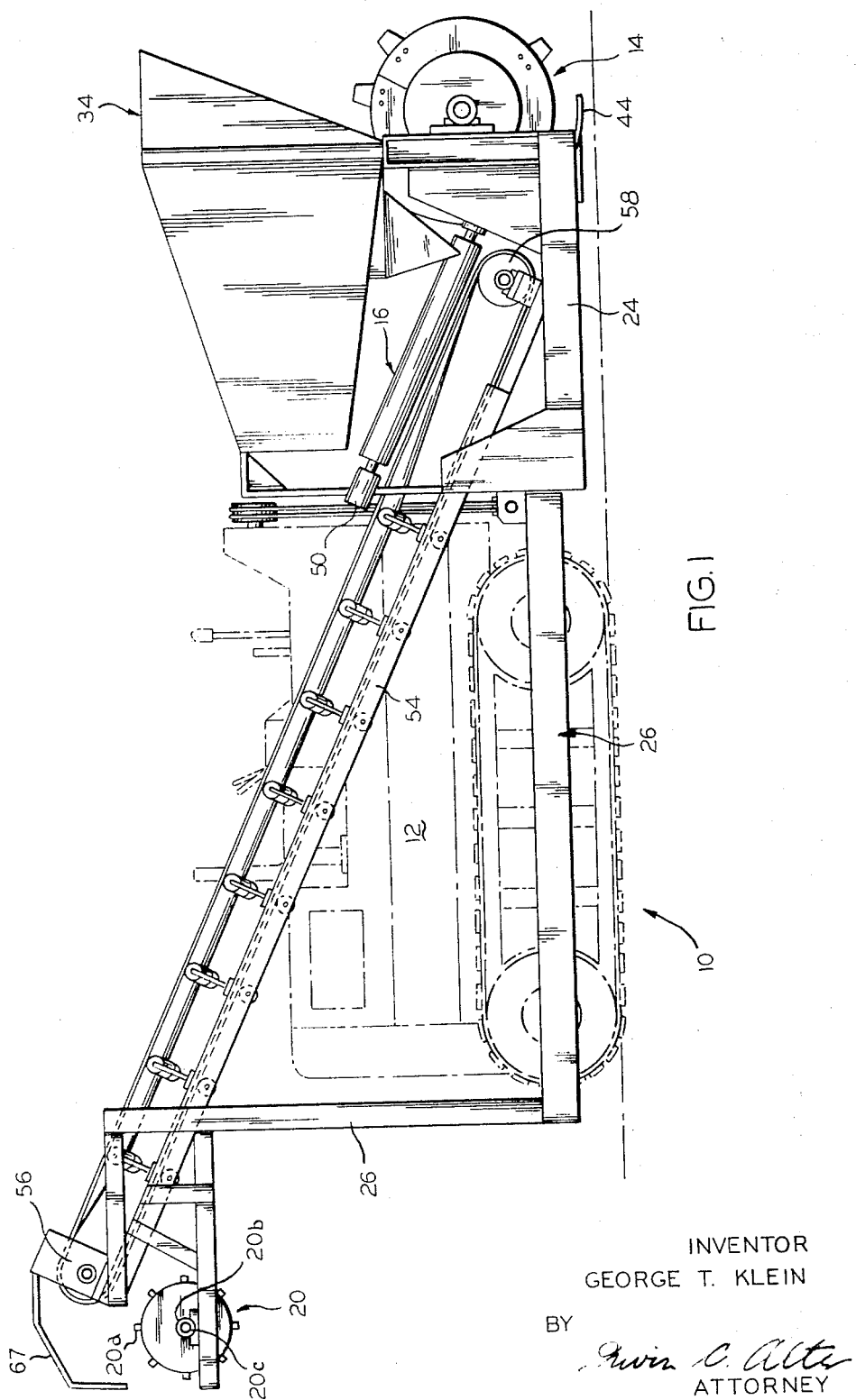

This invention relates to a new and improved machine for working and turning matter such as fertilizers, manures or soil conditioners and more particularly to a new and improved machine which turns and works windrows of organic compost to control decomposition of the matter contained therein so that finally upon complete decomposition, screening and bagging of the resulting mixture can be expeditiously accomplished.

One process for manufacturing organic compost is explained in my previous patent U.S. Patent No. 2,750,269. This patent calls for placing mixtures of straw, wood shavings, corn cobs and alfalfa which have been utilized as the bedding for cows so that they can collect other secretions such as manure, urine, etc., in windrows out in the open for the action of soot and air thereon. The windrows are preferably about three to four hundred feet in length, about twelve to fourteen feet in width and approximately seven to nine feet in depth at the crown. These windrows are then turned and worked to control the decomposition thereof so that finally after the complete decomposition of the matter contained therein the compost can be deposited on a screen and thoroughly agitated so that all of the fine material will pass therethrough and at this time the fine material can thereafter be bagged or otherwise packaged. Thus, a problem which exists is repeatedly agitating the long and tall windrows approximately once a week for about a two month period depending upon heat, sun and moisture. While that has heretofore been accomplished with manure spreaders, they have been found unsatisfactory because there are none made that can efficiently handle such vast amounts of compost without additional equipment and breakdowns.

My new and improved device works and processes the windrows with a unique auger that is attached to a tractor so that it is moved through the windrows and it is rotatably actuated as it is moved through the windrows by the tractor and it causes the compost to be forced toward the central portion of the auger. A first conveyor is attached to my device and it is disposed rearward of the auger so that as the compost from the windrows is moved toward the center of the auger it is deposited on the conveyor. A second conveyor is mounted to my device and is disposed to receive the compost from the first conveyor and thereafter carry the compost upward whereupon the compost is released and allowed to fall onto a rotatably mounted spreader which can be actuated to rotate clockwise or counterclockwise depending upon where it is desired to deposit the compost after it is dropped from the second conveyor. With this new and improved device, compost is thoroughly aerated and in adition to being agitate and worked it can be conveniently deposited, after processing, in the form of new windrows so that this operation can be repeated in approximately a week hence.

It is therefore an object of this invention to provide a new and improved device for processing fertilizer or the like.

It is further an object of this invention to provide a new and improved device which agitates and works compost more efficiently and aerates the compost material so that it decomposes more efficiently than with prior devices.

It is even further an object of this invention to provide a new and improved auger for working and agitating compost where the compost is efficiently guided so that it is deposited on conveyors, aerated and thereafter again deposited on the ground in the form of windrows.

It is even further an object of this invention to provide a device for processing compost or other matter wherein a new and improved auger that turns and lifts fertilizer in the path of said device is provided, whereby said device can be driven through said fertilizers without being impeded.

It is even still a further object of this invention to provide a conveying system that receives fertilizer or other matter from the auger of my device so that the same can be aerated and redeposited in piles afterward.

Figure 2:
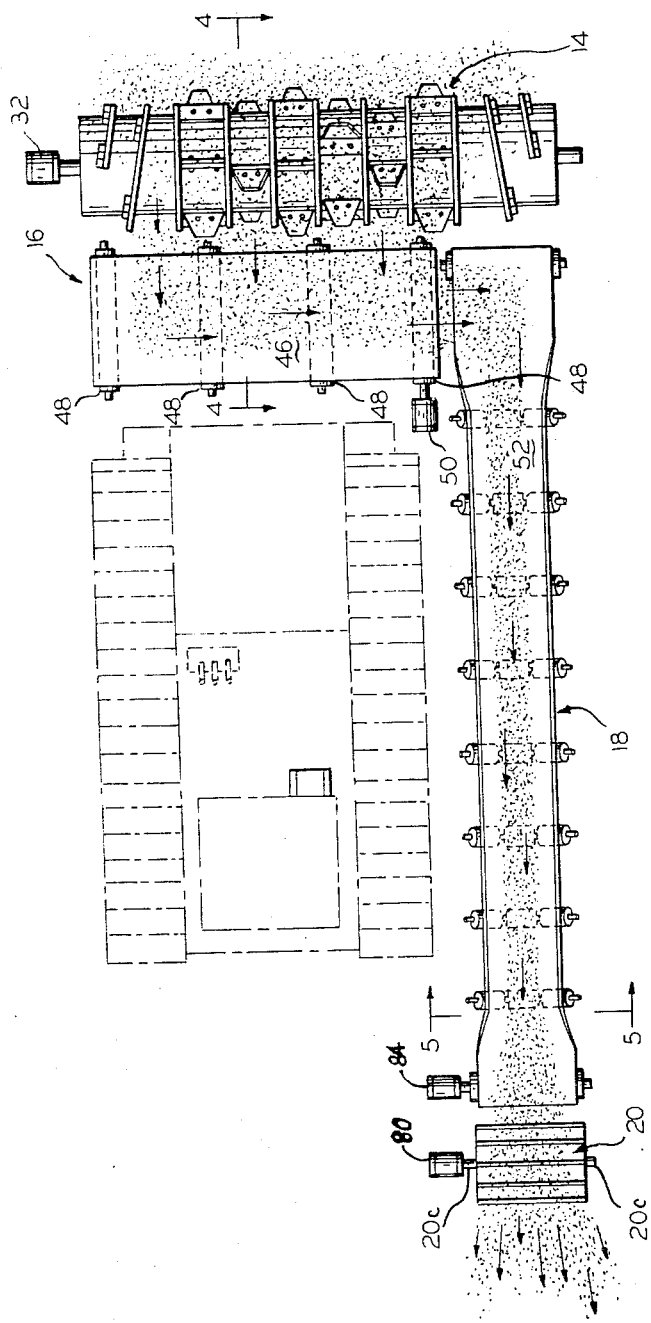
Figure 3:
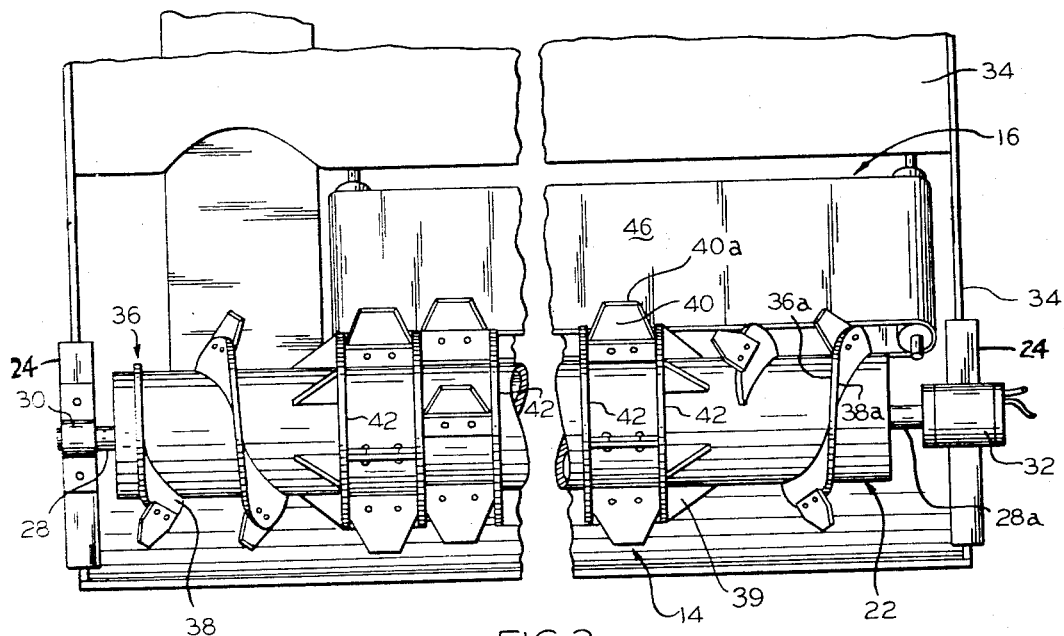
Figure 4:
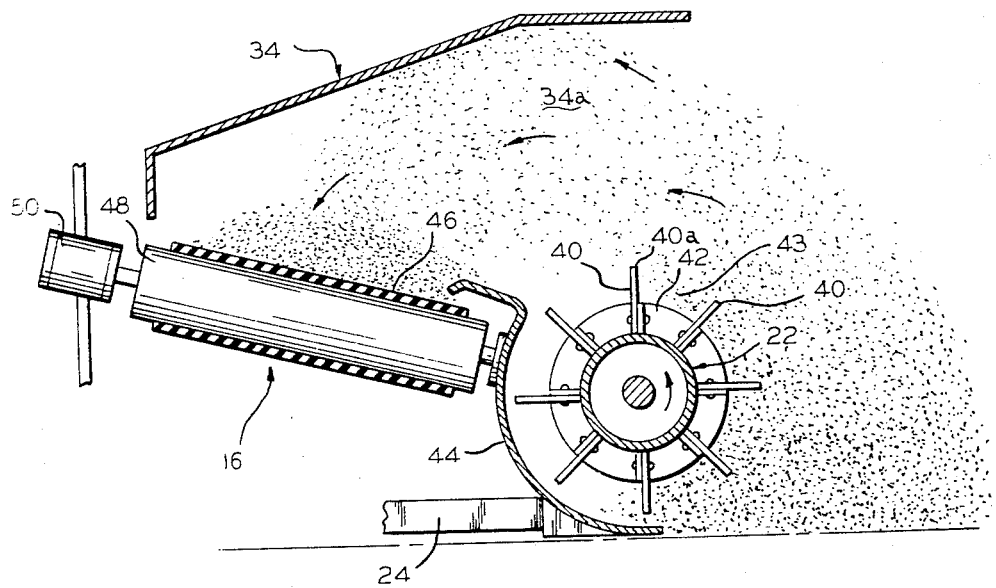
Figure 7:
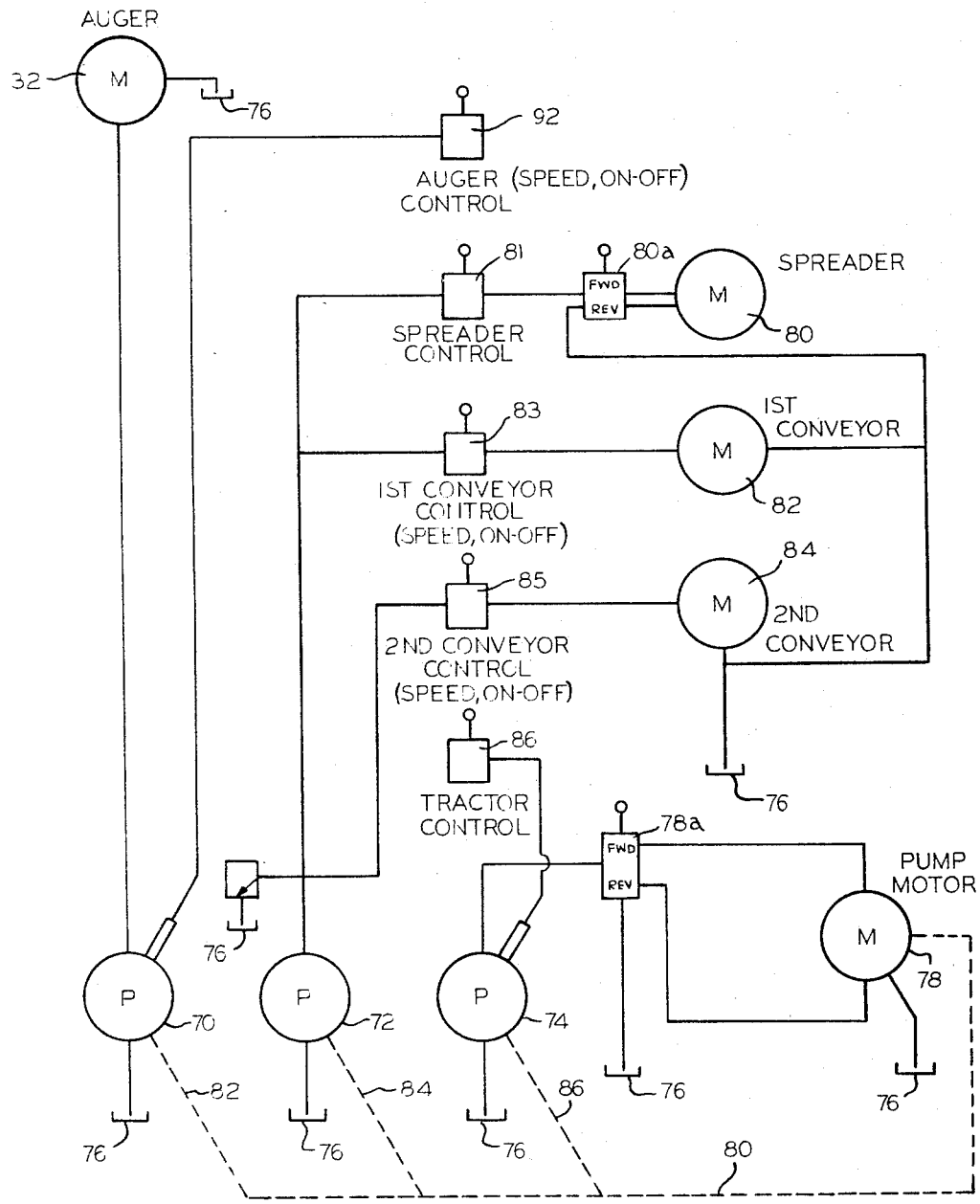

Other and further objects of this invention will become readily apparent from reading the specification in light of the accompanying drawings wherein:

FIGURE 1 is a side elevational view of my device;
FIGURE 2 is a plan view of my device as it is viewed from above looking downward thereon;
FIGURE 3 is a front elevational view illustrating the novel auger of my device;
FIGURE 4 is a fragmentary sectional view taken on a plane passing through a line 4—4 in FIGURE 2 and looking in the direction of the arrows;
FIGURE 5 is a sectional view taken on a plane passing through the line 5—5 in FIGURE 2 and looking in the direction of the arrows;
FIGURE 6 is an enlarged fragmentary view of a portion of FIGURE 1 wherein the spreader of my device is illustrated as being rotatable in two directions to guide compost selectively; and
FIGURE 7 is a diagrammatic view illustrating a preferable hydraulic system utilized in my device.

Referring to the drawings wherein like characters of reference indicate corresponding parts throughout, my new and improved device 10 includes a tractor vehicle 12 having an auger 14 attached thereto, a first conveyor 16 proximately disposed with respect to said auger, and a second conveyor 18 disposed to receive material conveyed from said first conveyor and to move said material through the atmosphere whereupon it deposits the material on a spreader 20 which can selectively direct the material in a plurality of directions.

The tractor 12 can be a conventional tractor which is adapted by additional hardware for association with the auger 14, conveyors 16 and 18 and spreader 20. As will be explained later these parts and the tractor are driven by means of a hydraulic system which is powered by pumps that are in turn driven by the tractor 12.

As seen from FIGURES 1 and 3 the auger 14 is preferably shown as having a cylindrical core 22 which is rotatably associated with a pair of arms 24 that are attached to the tractor by means of a brace 26 which extends from both sides of the tractor and also supports other parts (only one side of brace shown). Shaft portions 28, 28a extend from each end of the cylindrical core 22 with the shaft portion 28 being journalled in a bracket 30 and the shaft portion 28a being associated with a hydraulic motor 32 for rotatably driving the auger as will hereafter be explained. A hood 34 is associated with the arms 24 and extends from a position over the auger to a position rearward of the first conveyor 16 so that when compost is picked up by the auger it is guided onto the conveyor through the passageway 34a, as illustrated in FIGURE 4.

The auger has deflector portions 36, 36a disposed proximate to each end thereof. The deflector portions as illustrated in FIGURE 3, include lips 38, 38a which extend around the periphery of the core in a helical fashion from each of the ends of the core 22 to direct compost or the like which contacts the ends of the core toward the middle of the auger in order that the auger can lift the compost onto the first conveyor 16.

The central portion of the auger 14 has scoop members 40 attached thereto and mounted around the periphery of the core 22 as illustrated. The scoop members 40 also extend from the lips 38, 38a and at the central portion of the auger 14 the scoop members are separated laterally by ring members 42 which form scooping compartments 43 with the scoop members 40 at the central portion of the auger. The scoop members are preferably trapezoidal in shape, having a wider portion at the bottom thereof which is in contact with the core and tapering to a smaller width at their crowns 40a. The scoop members 40 located near the center of the auger also protrude outward with respect to the outer periphery of the rings 42 in order to have optimum lifting power when turning and working the compost. Also the scoop members in being replaceable prevent wear to the lips 38, 38a and to the rings 42. Web members 39 are attached to the end ring members 42 as illustrated in FIGURE 3 in order that the ring members are reinforced and in addition the end ring members and web members lift matter as the auger rotates.

Surrounding the bottom of the auger, as illustrated in FIGURE 4, is a shield member 44 which extends longitudinally along the auger and is interposed between and attached to the arms 24 as illustrated in FIGURES 1 and 4. The shield member 44 precludes the compost from settling on the tractor and, in addition, acts as a supporting means for the first conveyor 16. The first conveyor is a continuous conveyor disposed rearward of the auger and having a belt 46 which is mounted on a plurality of rollers 48, one of which is rotatably driven by a hydraulic motor 50. The conveyor is illustrated as being inclined with its belt 46 slanting upward from the shield member 44 toward the end of the hood 44 as illustrated in FIGURE 4 in order that an optimum amount of compost can be received on the belt by the auger.

The second conveyor 18, as seen from FIGURES 1 and 2 is disposed to one side of the tractor and it has a continuous belt 52 which extends from a location proximate to said first conveyor in an inclined direction upwardly. An inclined metal frame 54 which is attached to the device by the brace members 26 journals the rollers which are used in the second conveyor 18.

As illustrated in FIGURES 1 and 5, the second conveyor 18 has a pair of end rollers 56, 58 contacting the belt at the extreme ends of the conveyor and intermediate the ends of the conveyor there are a plurality of stations whereby the top of the conveyor has a curved contour that is formed by the rollers 60, 61, and 62. It will be noted that the rollers 60 and 62 are inclined whereas the rollers 61 are horizontal so that the belt 52 is curved to prevent droppage or spilling of the matter being carried thereby Each of the stations also has the horizontal rollers 64 supporting the belt at the underportion of the conveyor as illustrated in FIGURE 5.

Thus as compost or other matter is deposited on to the second conveyor it is guided upward to the upper end of the conveyor and is held intact by means of the curved contour of the belt 52. When the compost reaches the upper end of the conveyor, as illustrated in FIGURE 6, it contacts a shroud 67 which deflects same against the spreader 20 which is rotatably driven in the clockwise or counterclockwise direction by means of a hydraulic motor 69. The spreader 20 has deflectors 20a extending therefrom around the periphery thereof so that when the spreader is rotated it causes compost which is deposited thereon to be selectively deflected as illustrated in FIGURE 6. The spreader 20 has a shaft 20c protruding therethrough at each end thereof. The shaft is rotatably journalled to the braces 26 by means of the bracket portions 20b on each side thereof.

While there are enumerable ways of driving my device and the components thereof, FIGURE 7 illustrates a schematic diagram of a hydraulic system used for driving my device.

A pump motor 78 is attached to each of the pumps 70, 72 and 74 by means of a conduit 80 which has branches 82, 84, and 86 respectively connecting the pumps 70, 72 and 74 with the pump motor 78. Each of the pumps is driven by the tractor and in turn drives one or more hydraulic motors as will be hereafter explained. Pump motor 78 is associated with a speed reducer (not shown) and when said speed reducer is driven, the tractor wheels are actuated at a very slow speed so that the tractor can go slow enough to allow the other machinery to work the windrows. The pump 70 drives the auger motor 32 which is controlled by means of the auger control valve 92. The pump 72 drives the remaining components of the device by driving their respective hydraulic motors, namely, the spreader motor 80, the first conveyor motor 82 and second conveyor motor 84. Each of these motors is respectively controlled by the spreader control 81 first conveyor control 83, second conveyor control 85 and tractor control 86. With this type of hydraulic system the auger and tractor are driven by separate pumps while the remaining components are also driven by a single pump. Thus, the power from the drive shaft of the tractor is divided among the hydraulic motors by the separate pumps thereby utilizing and prorating all of the power generated from the drive shaft of the tractor.

Each of the motors are respectively controlled by the auger control 92 spreader control 81, first conveyor control 83, second conveyor control 85 and tractor control 86. It will be noted that both the spreader motor 80 and the pump motor 78 have forward and reverse controls 80a and 78a respectively so that the motors can be selectively driven in either direction. It will be noted that as the oil is pumped through the motors the oil is finally drained into the reservoir shown diagrammatically as 76.

From this description it is seen that my device has fulfilled the objects of my invention in a remarkably unexpected fashion. With the combination explained and illustrated, I am able to work the windrows more frequently and more efficiently and thereafter form the windrows. The windrows do not impede the motion of the vehicle, because the auger of my device turns and lifts the matter in its path and deposits same on the conveyor system which then conveys the matter while aerating the same until it is deposited on the spreader which further aerates the matter in addition to selectively directing the matter whereby it is redeposited in piles as the vehicle is propelled forward.

Although I have shown a specific construction of my device, I am fully cognizant of the fact that many changes in the shape and contour may be made without affecting its operativeness, and I reserve the rights to make such changes, as I may deem conveinent without departing from the spirit of my invention, or the scope of the claims;

I claim:

1. In a device for turning and working compost matter piled in windrows on the ground wherein there is a vehicle that is self-powered for movement along the ground, a rotatably driven auger associated with said vehicle,
said auger being disposed to rotate proximate to the ground,
said auger turning and lifting said windrows when said auger is forced thereagainst by movement of said vehicle,
and conveying means disposed rearward of said auger to receive said matter from said auger after said auger turns and lifts said matter,
said conveying means comprising a first conveyor which lies immediately adjacent to the lifting auger and parallel to the axis thereof to receive said matter thereon,
a second conveyor proximately disposed with relation to said first conveyor to receive said matter from said first conveyor,
said conveying means carrying said matter to expose same to the air and thereafter dropping said matter rearward of said vehicle to reform said piles with said worked and turned matter.

2. In a device for turning and working compost matter piled in windrows on the ground wherein there is a vehicle that is self-powered for movement along the ground,
a rotatably driven auger associated with said vehicle,
said auger being disposed to rotate proximate to the ground,
said auger turning and lifting said windrows when said auger is forced thereagainst by movement of said vehicle,
conveying means disposed rearward of said auger to receive said matter from said auger after said auger turns and lifts said matter,
said conveying means carrying said matter to expose same to the air and thereafter dropping said matter rearward of said vehicle to reform said piles with said worked and turned matter, and
said auger comprising a cylindrical core with deflector portions near the end portions thereof,
said deflector portions causing said matter to be moved toward the central portion of said auger, and
said core having adjacent scooping compartments at the central portion thereof to turn and lift said matter.

3. In a device for turning and working compost matter piled in windows on the ground wherein there is a vehicle that is self-powered for movement along the ground,
a rotatably driven auger associated with said vehicle,
said auger comprising a cylindrical core with deflector portions near the end portions thereof,
said deflector portions causing said matter to be moved toward the central portion of said auger,
said deflector portions including lifts which extend around the periphery of the core in a helical fashion,
said core further comprising adjacent scooping compartments at the central portion thereof to turn and lift said matter,
said compartments comprising spaced apart circular rings around the periphery of said core at the central portion thereof, and
scoop members attached to the periphery and interposed between said ring members to form said scooping compartments with said circular rings, and
conveying means disposed rearward of said auger to receive said matter from said auger after said auger turns and lifts said matter,
said conveying means carrying said matter to expose said matter to the air and thereafter dropping said matter rearward of said vehicle to reform said piles with said worked and turned matter.

4. In a device for turning and working compost matter piled in windows on the ground wherein there is a vehicle that is self-powered for movement along the ground,
a rotatably driven auger associated with said vehicle,
said auger being disposed to rotate proximate to the ground,
said auger turning and lifting said windows when said auger is forced thereagainst by movement of said vehicle,
said auger having a cylindrical core with deflector portions near the end portions thereof,
said deflector portions causing said matter to be moved toward the central portion of said auger,
said deflector portions including lifts which extend around the periphery of the core in a helical fashion,
said core having scooping compartments at the central portions thereof to turn and lift said matter,
said compartments comprising spaced apart circular rings around the periphery of said core at the central portion thereof,
scoop members attached to the periphery and interposed between said ring members thereby forming said scooping compartments with said circular rings,
conveying means disposed rearward of said auger to receive said matter from said auger after said auger turns and lifts said matter,
a hood extending over said auger and forming a passageway for said matter between said conveying means and said auger,
whereby matter is lifted and turned by said auger and is deposited on said conveying means,
said conveying means including a first conveyor which has a conveyor belt that extends substantially longitudinally along said auger rearward thereof to receive said matter thereon, and
said conveying means carrying said matter to expose same to the air thereafter dropping said matter rearward of said vehicle to reform said piles with said worked and turned matter.

5. A device, as defined in claim 4, wherein said first conveyor is inclined in order that the belt thereof more effectively receives said matter from said auger.

6. A device, as defined in claim 4, wherein a second conveyor is proximately disposed with relation to said first conveyor to receive said matter from said first conveyor,
said second conveyor extending upwardly along the side of said vehicle along an incline.

7. A device, as defined in claim 4, wherein a rotatably driven spreader member is disposed below said second conveyor,
said spreader member contacting said matter after said matter travels to the end of said second conveyor and descends therefrom,
said spreader member being selectively rotatable in either direction to selectively cause said matter to be deposited on the ground.

References Cited

UNITED STATES PATENTS

| | | | |
|---|---|---|---|
| 1,911,895 | 5/1933 | Hemscheidt | 198—9 |
| 2,155,423 | 4/1939 | Korsmo | 198—104 |
| 2,774,210 | 12/1956 | Kay | 198—9 |

EDWARD A. SROKA, *Primary Examiner.*

U.S. Cl. X.R.

198—9